US009647304B2

(12) United States Patent
Kimura et al.

(10) Patent No.: US 9,647,304 B2
(45) Date of Patent: May 9, 2017

(54) BATTERY COOLING STRUCTURE INCLUDING HEAT TRANSFER SHEET (71) Applicant: HONDA MOTOR CO., LTD., Tokyo (JP)

(72) Inventors: Arihisa Kimura, Wako (JP); Goichi Katayama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 315 days.

(21) Appl. No.: 14/361,134

(22) PCT Filed: Dec. 5, 2012

(86) PCT No.: PCT/JP2012/081508
§ 371 (c)(1),
(2) Date: May 28, 2014

(87) PCT Pub. No.: WO2013/084938
PCT Pub. Date: Jun. 13, 2013

(65) Prior Publication Data
US 2014/0370340 A1    Dec. 18, 2014

(30) Foreign Application Priority Data
Dec. 9, 2011   (JP) ................... 2011-269833

(51) Int. Cl.
*H01M 2/10* (2006.01)
*H01M 10/647* (2014.01)
(Continued)

(52) U.S. Cl.
CPC ..... *H01M 10/6554* (2015.04); *H01M 2/1077* (2013.01); *H01M 10/6561* (2015.04); *H01M 2220/20* (2013.01)

(58) Field of Classification Search
CPC ........... H01M 10/647; H01M 10/6554; H01M 10/6556; H01M 10/6561
(Continued)

(56) References Cited

U.S. PATENT DOCUMENTS

2010/0236854 A1* 9/2010 Nakamura .............. B60K 1/04
180/68.5
2011/0189523 A1* 8/2011 Eom ..................... H01M 10/60
429/120
(Continued)

FOREIGN PATENT DOCUMENTS

DE   WO 2010112386 A2 * 10/2010 ............... B60K 1/04
JP   2002-202729 A   7/2002
(Continued)

OTHER PUBLICATIONS

International Search Report dated Jan. 29, 2013 issued in corresponding application No. PCT/JP2012/081508.
(Continued)

*Primary Examiner* — Sean P Cullen
(74) *Attorney, Agent, or Firm* — Westerman, Hattori, Daniels & Adrian, LLP (57) ABSTRACT

A battery cooling structure in which a heat transfer sheet that can be deformed by pressure is held between a cooling plate and a cooling surface of a battery module in which a plurality of battery cells are stacked, and heat of the battery module is transferred from the cooling surface to the cooling plate via the heat transfer sheet to thus carry out cooling, wherein the cooling plate is a hollow member in which a cooling medium passage is formed for a cooling medium to flow, and the heat transfer sheet is formed so as to have a larger thickness in a middle part than in an outer peripheral part.

2 Claims, 11 Drawing Sheets (51) Int. Cl.
*H01M 10/6554* (2014.01)
*H01M 10/6556* (2014.01)
*H01M 10/6561* (2014.01)

(58) Field of Classification Search
USPC .................................................. 429/72, 120
See application file for complete search history.

(56) References Cited

U.S. PATENT DOCUMENTS

| | | | |
|---|---|---|---|
| 2011/0200862 A1 | 8/2011 | Kurosawa | |
| 2012/0171543 A1* | 7/2012 | Hirsch | B60K 1/04 |
| | | | 429/120 |
| 2012/0234613 A1* | 9/2012 | Miyatake | E02F 9/0858 |
| | | | 180/65.1 |
| 2013/0146249 A1* | 6/2013 | Katayama | F28F 9/00 |
| | | | 165/46 |
| 2013/0149582 A1* | 6/2013 | Kimura | H01M 10/50 |
| | | | 429/120 |

FOREIGN PATENT DOCUMENTS

| | | | |
|---|---|---|---|
| JP | 2002-217340 A | 8/2002 | |
| JP | 2007-180281 A | 7/2007 | |
| JP | 2011-34775 A | 2/2011 | |
| JP | WO 2011070758 A1 * | 6/2011 | ............ E02F 9/0858 |
| JP | 2011-171029 A | 9/2011 | |
| WO | 2010/112386 A2 | 10/2010 | |

OTHER PUBLICATIONS

Japanese Office Action dated Jan. 21, 2015, issued in corresponding Japanese Patent Application No. 2013-548268 (3 pages).

\* cited by examiner

FIG.9
STATE OF BATTERY MODULE SET ON COOLING PLATE

FIG.10
STATE OF BATTERY MODULE SET ON COOLING PLATE

BATTERY COOLING STRUCTURE INCLUDING HEAT TRANSFER SHEET

TECHNICAL FIELD

The present invention relates to a battery cooling structure in which a heat transfer sheet that can be deformed by pressure is held between a cooling plate and a cooling surface of a battery module in which a plurality of battery cells are stacked, and heat of the battery module is transferred from the cooling surface to the cooling plate via the heat transfer sheet to thus carry out cooling.

BACKGROUND ART

When cooling is carried out by supporting a cooling surface of a battery module on a hollow cooling plate having a cooling medium flowing through its interior and transferring the heat of the battery module to the cooling plate via the cooling surface, since it is inevitable that a minute gap will occur between the cooling plate and the cooling surface of the battery module, which are both rigid, there is the problem that the performance in cooling the battery module is degraded due to inhibition of thermal conduction between the cooling surface and the cooling plate because of the gap.

In order to solve this problem, an arrangement in which a deformable heat transfer sheet having excellent thermal conductivity is held between a cooling plate and a cooling surface of a battery module and any gap between the cooling plate and the cooling surface of the battery module is eliminated by deformation of the heat transfer sheet to thus promote heat transfer from the cooling surface to the cooling plate, thereby enhancing the performance in cooling the battery module, is known from Patent Document 1 below.

RELATED ART DOCUMENTS

Patent Document

Patent Document 1: Japanese Patent Application Laid-open No. 2011-34775

SUMMARY OF THE INVENTION

Problems to be Solved by the Invention

With regard to the arrangement described in Patent Document 1 above, the cooling plate is formed so as to be hollow and a cooling medium flows through its interior, and there is therefore a possibility that an upper face of the cooling plate, which is subjected to the weight of the battery module, will bend so as to protrude downwardly. When the upper face of the cooling plate bends in this way, the distance between the cooling plate and an outer peripheral part of the cooling surface of the battery module becomes small and the heat transfer sheet is sufficiently squashed and deformed, but the distance between the cooling plate and the middle part of the cooling surface of the battery module becomes large and the heat transfer sheet cannot be sufficiently squashed and deformed, resulting in a gap occurring between the heat transfer sheet and the cooling plate or between the heat transfer sheet and the cooling surface in the middle part, thus degrading the thermal conductivity and thereby degrading the effect in cooling the battery module.

The present invention has been accomplished in light of the above circumstances, and it is an object thereof to ensure the thermal conductivity by uniformly deforming a heat transfer sheet held between a battery module and a cooling plate.

Means for Solving the Problems

In order to attain the above object, according to a first aspect of the present invention, there is provided a battery cooling structure in which a heat transfer sheet that can be deformed by pressure is held between a cooling plate and a cooling surface of a battery module in which a plurality of battery cells are stacked, and heat of the battery module is transferred from the cooling surface to the cooling plate via the heat transfer sheet to thus carry out cooling, characterized in that the cooling plate is a hollow member in which a cooling medium passage is formed for a cooling medium to flow, and the heat transfer sheet is formed so as to have a larger thickness in a middle part than in an outer peripheral part.

Further, according to a second aspect of the present invention, in addition to the first aspect, the heat transfer sheet comprises a groove in the outer peripheral part and the middle part, a width of the groove in the middle part being smaller than a width of the groove in the outer peripheral part.

A positioning groove 21*b* of an embodiment corresponds to the groove of the present invention.

Effects of the Invention

In accordance with the first aspect of the present invention, when the battery module is supported on the cooling plate, since the heat transfer sheet that can be deformed by pressure is held between the cooling plate and the cooling surface of the battery module, it is possible, by deforming the heat transfer sheet, to prevent a gap from occurring between the cooling plate and the cooling surface of the battery module, thus efficiently transferring the heat of the battery module from the cooling surface to the cooling plate via the heat transfer sheet and thereby enhancing the effect in cooling the battery module. Since the cooling plate is a hollow member having formed therein the cooling medium passage, through which a cooling medium flows, if the cooling plate flexes downwardly due to the weight of the battery module, the distance between the cooling plate and the outer peripheral part of the cooling surface of the battery module becomes small and the heat transfer sheet is sufficiently squashed and deformed, but the distance between the cooling plate and the middle part of the cooling surface of the battery module becomes large, and the heat transfer sheet cannot be sufficiently squashed and deformed, resulting in the possibility that a gap will occur in that part and the thermal conductivity will be degraded. However, since the heat transfer sheet is formed so as to have a larger thickness in the middle part than in the outer peripheral part, it becomes possible to squash and deform the heat transfer sheet evenly over the entire region, thus preventing a gap from occurring between the heat transfer sheet and the cooling surface of the battery module or between the cooling plate and the heat transfer sheet and thereby guaranteeing the thermal conductivity. Furthermore, when the cooling plate flexes downwardly, the middle part of the battery module supported thereon also attempts to flex downwardly, but it is possible, by increasing the thickness of the middle part of the heat transfer sheet, to increase the upward reaction force of that part, thus preventing the battery module from flexing.

Furthermore, in accordance with the second aspect of the present invention, since the width of the groove in the middle part of the heat transfer sheet is smaller than the width of the groove in the outer peripheral part of the heat transfer sheet, it is possible, by making the middle part of the heat transfer sheet resistant to deformation, to increase the upward reaction force, thereby more reliably preventing flexing of the battery module by means of the reaction force.

BRIEF DESCRIPTION OF DRAWINGS

FIG. 7(B) is a view taken along line B-B in FIG. 7(A) and FIG. 7(C) is a view taken along line C-C in FIG. 7(B). That is, FIG. 7(C) shows a back side of the sheet shown in FIG. 7(A).

EXPLANATION OF REFERENCE NUMERALS
AND SYMBOLS

12 Cooling plate
12c Cooling medium passage
13 Battery module
14 Battery cell
14a Cooling surface
21 Heat transfer sheet
21b Positioning groove (groove)

MODES FOR CARRYING OUT THE INVENTION

A mode for carrying out the present invention is explained below by reference to FIG. 1 to FIG. 11.

Figure 1:
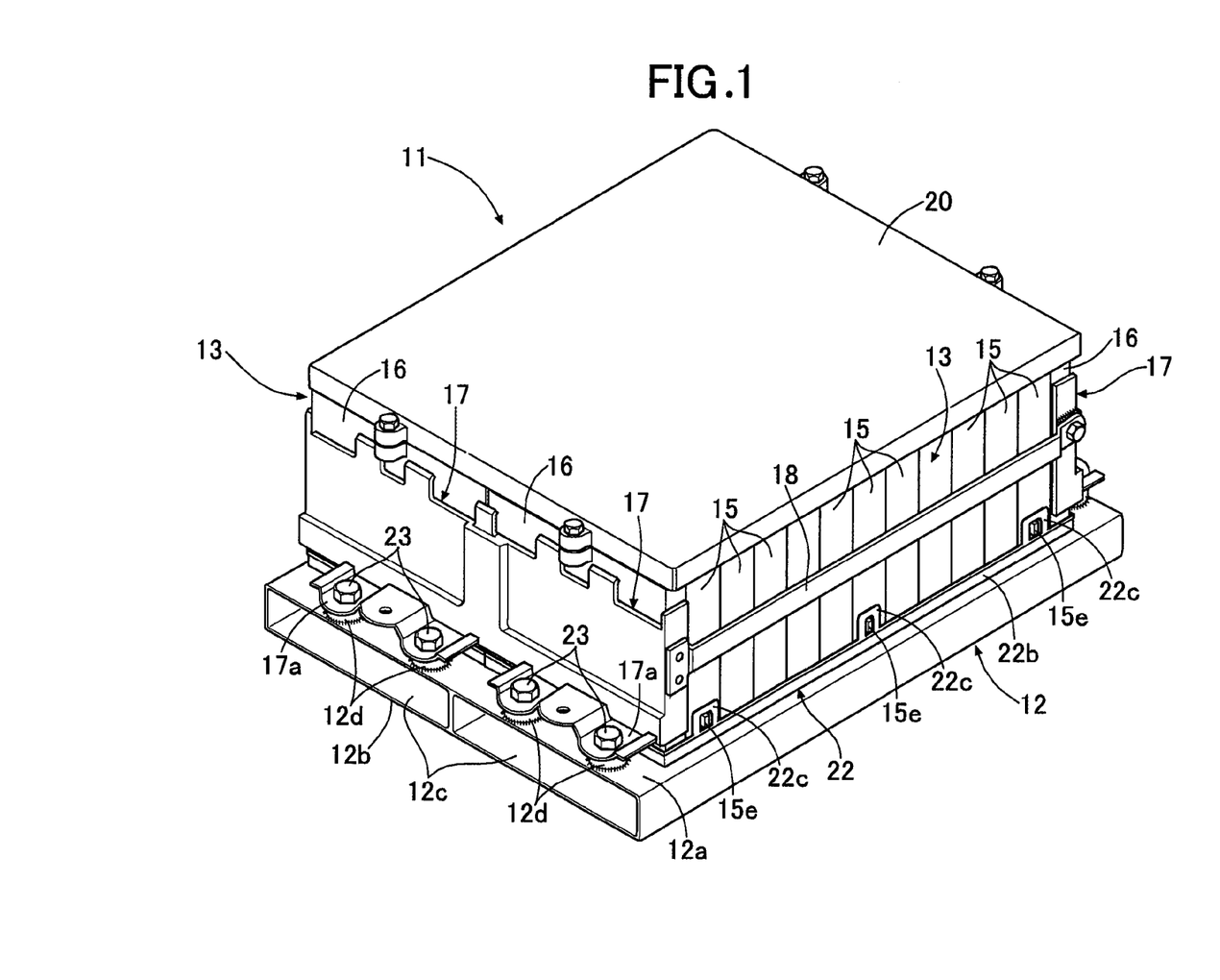
FIG. 1 is a perspective view of a battery module. (first embodiment)
Figure 2:
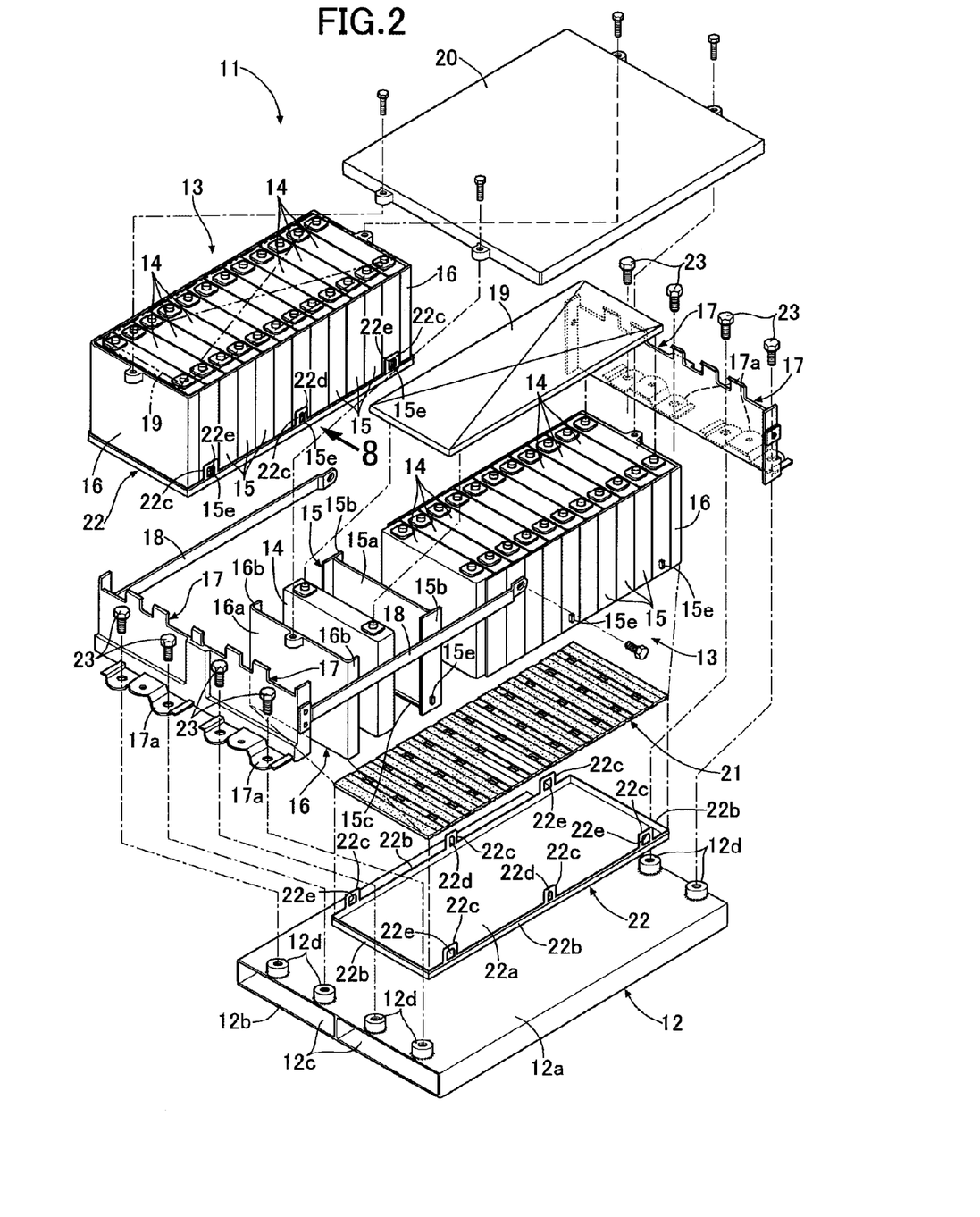
FIG. 2 is an exploded perspective view of the battery module. (first embodiment)

As shown in FIG. 1 and FIG. 2, a battery pack 11 mounted on an electric automobile is formed by supporting a plurality of battery modules 13 on a cooling plate 12; FIG. 1 and FIG. 2 show part of the cooling plate 12 and two battery modules 13 and 13. In the present embodiment, the two battery modules 13 and 13 are integrated, but the structures of the battery modules 13 are substantially identical.

The battery module 13 is formed by stacking a plurality (12 in the embodiment) of battery cells 14 each having a rectangular shape with synthetic resin intermediate holders 15 held therebetween and by stacking synthetic resin end holders 16 and 16 on outer sides of two battery cells 14 and 14 positioned at opposite ends in the stacking direction.

As shown in FIG. 3 to FIG. 6, the intermediate holder 15, whose horizontal cross section is formed into an H-shape, includes a plate-shaped holder main body portion 15a held between two adjacent battery cells 14 and 14, a pair of side flanges 15b and 15b protruding from left and right edges of the holder main body portion 15a toward opposite sides in the stacking direction, and a lower flange 15c protruding from the lower edge of the holder main body portion 15a toward opposite sides in the stacking direction. Due to the side flanges 15b of the adjacent intermediate holders 15 meshing with each other, the positional relationship between the intermediate holders 15 is restricted, and as a result the positional relationship between a plurality of the battery cells 14 is restricted. The width of the lower flange 15c is smaller than the width of the side flanges 15b and 15b, and even in a state in which the side flanges 15b of adjacent intermediate holders 15 are meshed with each other the lower flanges 15c do not mesh with each other, a lower face (a cooling surface 14a, which is described later) of the battery cells 14 being exposed between the lower flanges 15c.

The end holder 16, whose horizontal cross section is formed into a squared U-shape, includes a plate-shaped holder main body portion 16a abutting against an outer face of the battery cell 14 positioned at the outer end in the stacking direction and a pair of side flanges 16b and 16b protruding inwardly in the stacking direction from left and right edges of the holder main body portion 16a. Due to the side flanges 16b and 16b meshing with the side flanges 15b and 15b of the adjacent intermediate holder 15, the positional relationship between all of the intermediate holders 15 and the end holders 16 and 16 is restricted.

Returning to FIG. 1 and FIG. 2, a pair of end plates 17 and 17 are superimposed on outer faces, in the stacking direction, of the pair of end holders 16 and 16 of each battery module 13, and twelve battery cells 14, eleven intermediate holders 15, and two end holders 16 and 16 are tightly integrated by fastening the pair of end plates 17 and 17 by means of a fastening band 18. Two fastening bands 18 and 18 are shared between two battery modules 13 and 13. Abutting faces of the battery cells 14, intermediate holders 15, and end holders 16 and 16 are secured by means of an adhesive.

A bus bar plate 19 retaining a plurality of bus bars, which are not illustrated, is fixed to an upper face of the battery module 13, and terminals of the battery cells 14 are electrically connected by means of the bus bar plate 19. Upper faces of the two battery modules 13 and 13 arranged side by side are covered by a common synthetic resin cover 20.

Lower faces of the twelve battery cells 14 forming the battery module 13, that is, lower faces of the battery modules 13, form cooling surfaces 14a (see FIG. 3 to FIG. 6) opposing an upper face of the cooling plate 12, and one rectangular heat transfer sheet 21 is held between these cooling surfaces 14a and an upper face of the cooling plate 12. The material for the heat transfer sheet 21 is a synthetic resin having excellent thermal conductivity (for example, a silicone rubber), and can be squashed and deformed into any shape when pressure is applied. Furthermore, the surface of the heat transfer sheet 21 has sticky characteristics (tackiness).

An insulating sheet 22 is disposed between a lower face of the heat transfer sheet 21 and the upper face of the cooling plate 12. The insulating sheet 22 is made of a synthetic resin, such as PP (polypropylene) or PPS (polyphenylene sulfide), that is nonconductive and water repellent and is formed into a shallow tray shape having a bottom wall portion 22a and side wall portions 22b rising therefrom, a lower part of the battery module 13 being fitted into the interior. Therefore, the upper face of the heat transfer sheet 21 abuts against the cooling surfaces 14a of the battery cells 14, and the lower face of the heat transfer sheet 21 abuts against the upper face of the insulating sheet 22. Since the insulating sheet 22 has a very small thickness, there is almost no interference with heat transfer.

The cooling plate 12 is a metallic hollow member having excellent thermal conductivity, and a cooling medium passage 12c for a cooling medium (for example, cooling air) to flow is defined between an upper wall portion 12a and a lower wall portion 12b. Cooling air that has been sucked in by means of a cooling fan, which is not illustrated, flows through the cooling medium passage 12c of the cooling plate 12, and carries out heat exchange with heat that has been transferred from the cooling surfaces 14a of the battery cells 14 to the upper wall portion 12a via the heat transfer sheet 21 and the insulating sheet 22, thus cooling the battery cells 14.

Figure 7:
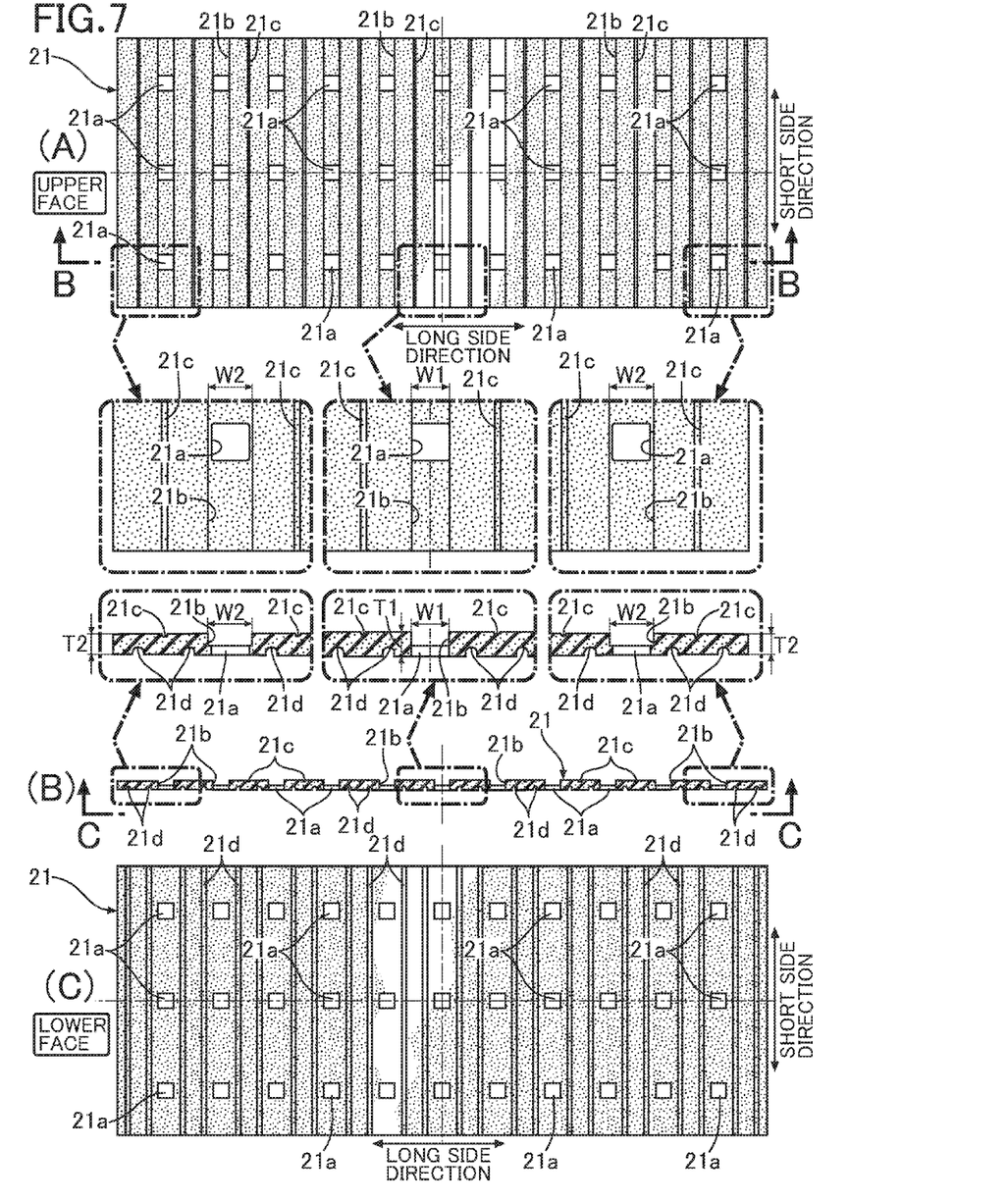
FIGS. 7(A) to (C) show views of the shape of a heat transfer sheet. (first embodiment)

As shown in FIG. 7, the heat transfer sheet 21 is a rectangular sheet having its long side along the direction in which the battery cells 14 are stacked and having its short side along a direction perpendicular thereto, the thickness being constant along the short side but not constant along the long side. That is, with regard to the heat transfer sheet 21, a thickness T1 of a middle part in the long side direction is large (for example, 4.1 mm), a thickness T2 of opposite end parts in the long side direction is small (for example, 3.1 mm), and the thickness changes continuously between these parts.

Furthermore, in the heat transfer sheet 21, a total of twenty-two positioning holes 21a are formed along the long side direction as two rows. Two of the positioning holes 21a and 21a oppose a lower face of each of the lower flanges 15c of the intermediate holders 15 sandwiched between pairs of adjacent battery cells 14 and 14. The shape of the positioning hole 21a is a square, but the corners are rounded. The width of the lower flange 15c is smaller than the width of the positioning holes 21a and 21a, and it is therefore possible to view opposite edges of the lower flange 15c through the positioning holes 21a and 21a.

Formed on the upper face of the heat transfer sheet 21, that is, the face opposing the cooling surfaces 14a of the battery cells 14, are a total of eleven positioning grooves 21b extending in parallel to the short side. In the present embodiment, two positioning holes 21a and 21a overlap each positioning groove 21b. The lower flanges 15c of the intermediate holders 15 protrude downwardly from the cooling surfaces 14a of the battery cells 14, and these lower flanges 15c are fitted into the positioning grooves 21b. The eleven positioning grooves 21b are given a stepwise difference so that a width W1 is small in an area where the thickness of the heat transfer sheet 21 is large (middle part in the long side direction) and a width W2 is large in an area where the thickness of the heat transfer sheet 21 is small (opposite end parts in the long side direction).

Formed on the upper face of the heat transfer sheet 21 are a total of twelve first air vent grooves 21c along the middle part of the cooling surfaces 14a of the battery cells 14. Therefore, the eleven positioning grooves 21b and the twelve first air vent grooves 21c are formed in turn and in parallel to each other. Furthermore, formed on a lower face of the heat transfer sheet 21 are a total of twenty-four paired second air vent grooves 21d along intermediate positions with respect to the positioning grooves 21b and the first air vent grooves 21c. Two second air vent grooves 21d and 21d oppose the cooling surface 14a of one battery cell 14, and positions of the second air vent grooves 21d are displaced in the long side direction so as not to overlap the positions of the positioning grooves 21b and the positions of the first air vent grooves 21c. The cross-sectional area of the second air vent grooves 21d is set so as to be larger than the cross-sectional area of the first air vent grooves 21c.

Opposite end parts of the positioning grooves 21b, the first air vent grooves 21c, and the second air vent grooves 21d extend to and open on the pair of long sides of the heat transfer sheet 21.

Formed at lower ends of the intermediate holders 15 and the end holders 16 and 16 along the entire peripheries are projecting wall portions 15d, 16c, 16c extending downwardly from the cooling surfaces 14a of the battery cells 14 and protruding so as to turn in toward the cooling surfaces 14a. These projecting wall portions 15d, 16c, 16c are formed so as to surround the outer periphery of the heat transfer sheet 21 across a small gap α (see FIG. 4 to FIG. 6), and the height to which they downwardly protrude from the cooling surfaces 14a is set so as to be smaller than the thickness of the heat transfer sheet 21.

Figure 3:
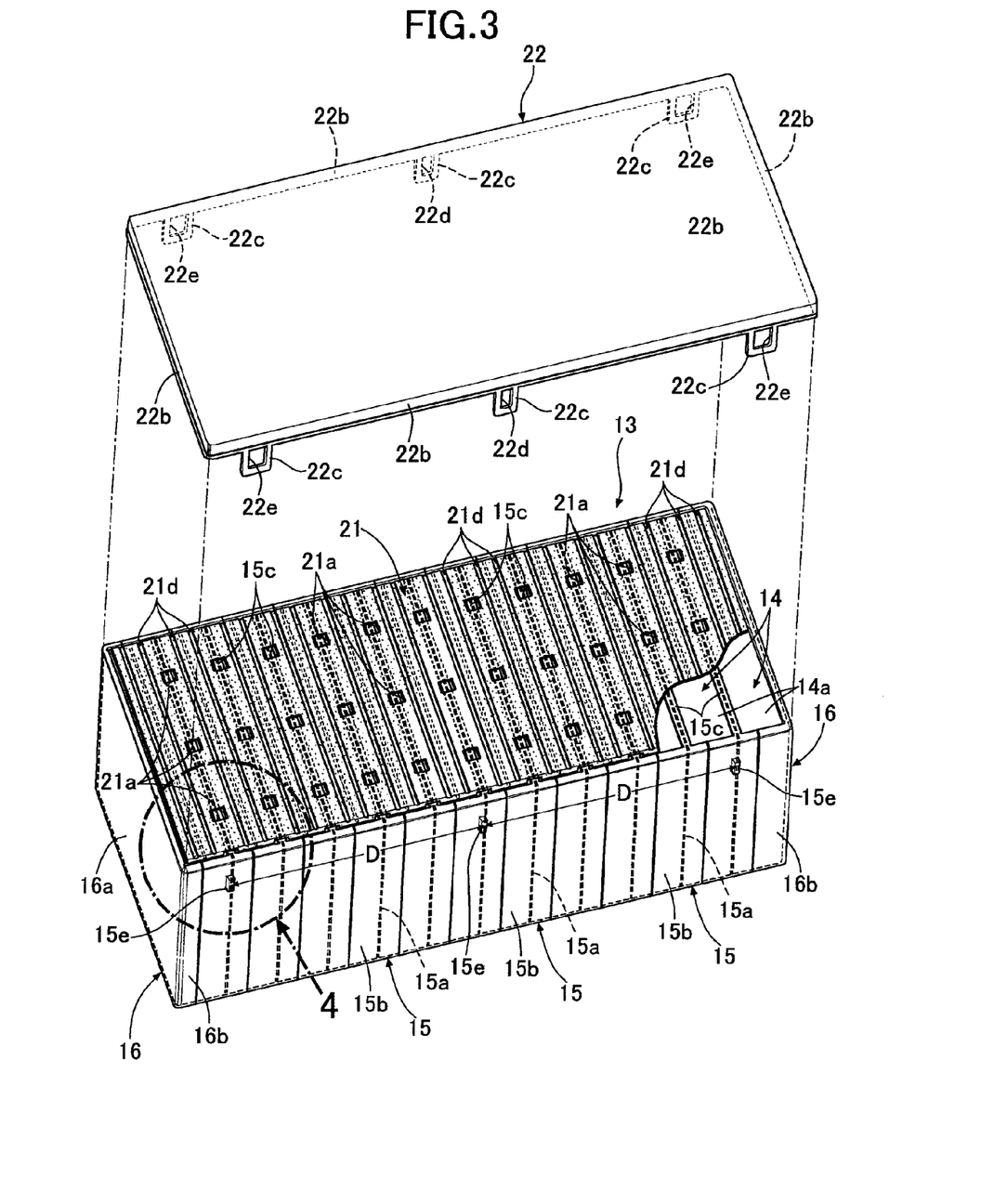
FIG. 3 is a perspective view of the battery module in an upside down state. (first embodiment)
Figure 8:
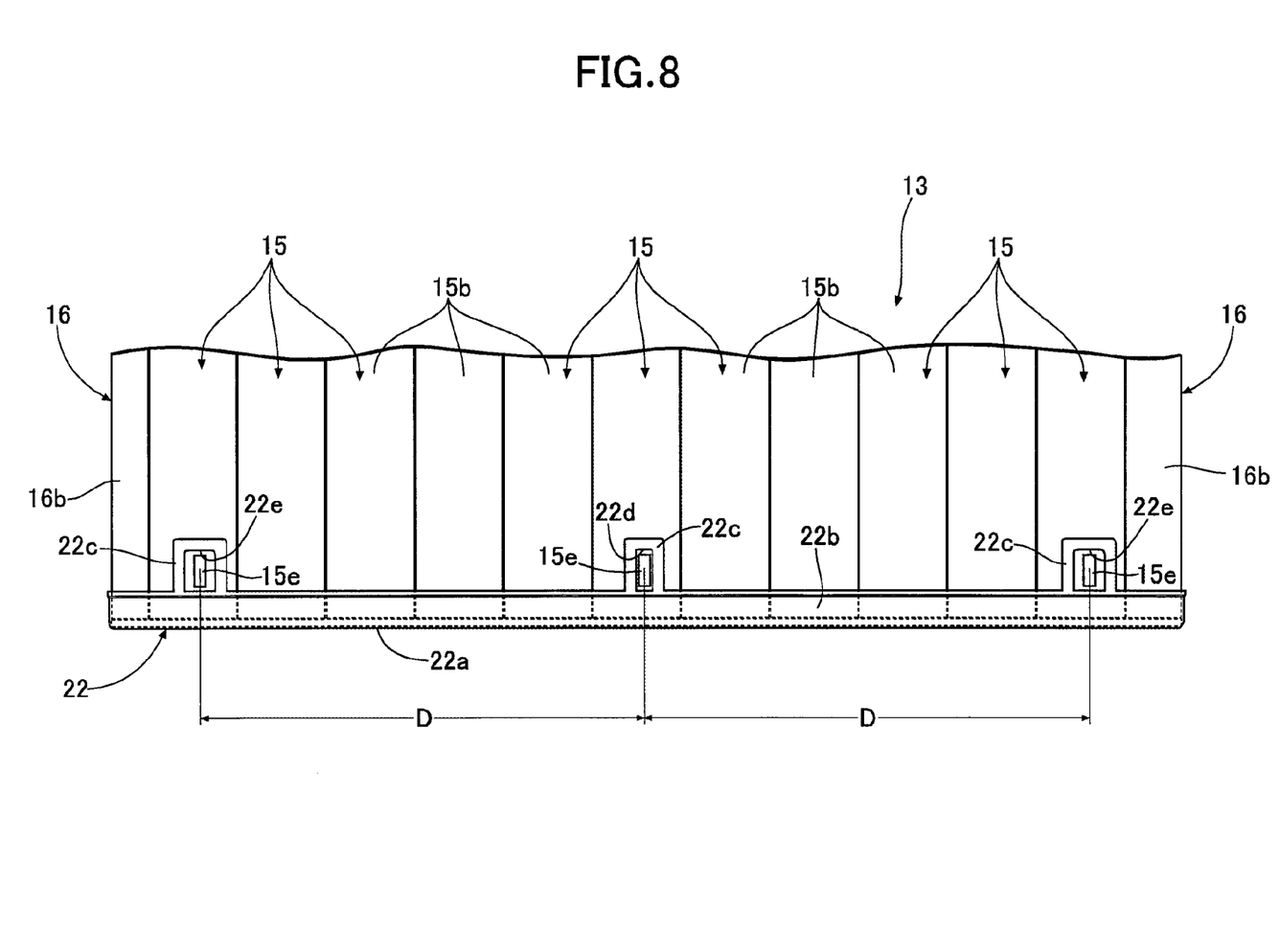
FIG. 8 is a view in the direction of arrow 8 in FIG. 2. (first embodiment)

As shown in FIG. 3 and FIG. 8, three latching portions 22c are projectingly provided at the upper edge of each of side wall portions 22b and 22b corresponding to the pair of long sides of the insulating sheet 22, latching holes 22d and 22d having a short length in the long side direction are formed in two middle latching portions 22c and 22c, and latching holes 22e having a long length in the long side direction are formed in four latching portions 22c at opposite ends. On the other hand, latching projections 15e are projectingly provided on opposite side faces of three intermediate holders 15 corresponding to the positions of the latching portions 22c, the latching projections 15e being capable of engaging with the latching holes 22d, 22d, 22e of the insulating sheet 22.

The operation of the embodiment of the present invention having the above arrangement is now explained.

As shown in FIG. 3, after assembly of the two integrated battery modules 13 and 13 is completed, the heat transfer sheet 21 is positioned on the cooling surfaces 14a of the battery cells 14 of each battery module 13 and affixed to the cooling surfaces 14a by utilizing its tackiness. In this process, if the heat transfer sheet 21 is affixed to a position by mistake, when it is pulled away, there is a possibility that the flexible heat transfer sheet 21 will be damaged, and it is therefore necessary to affix the heat transfer sheet 21 to the correct position at the first attempt.

Figure 4:
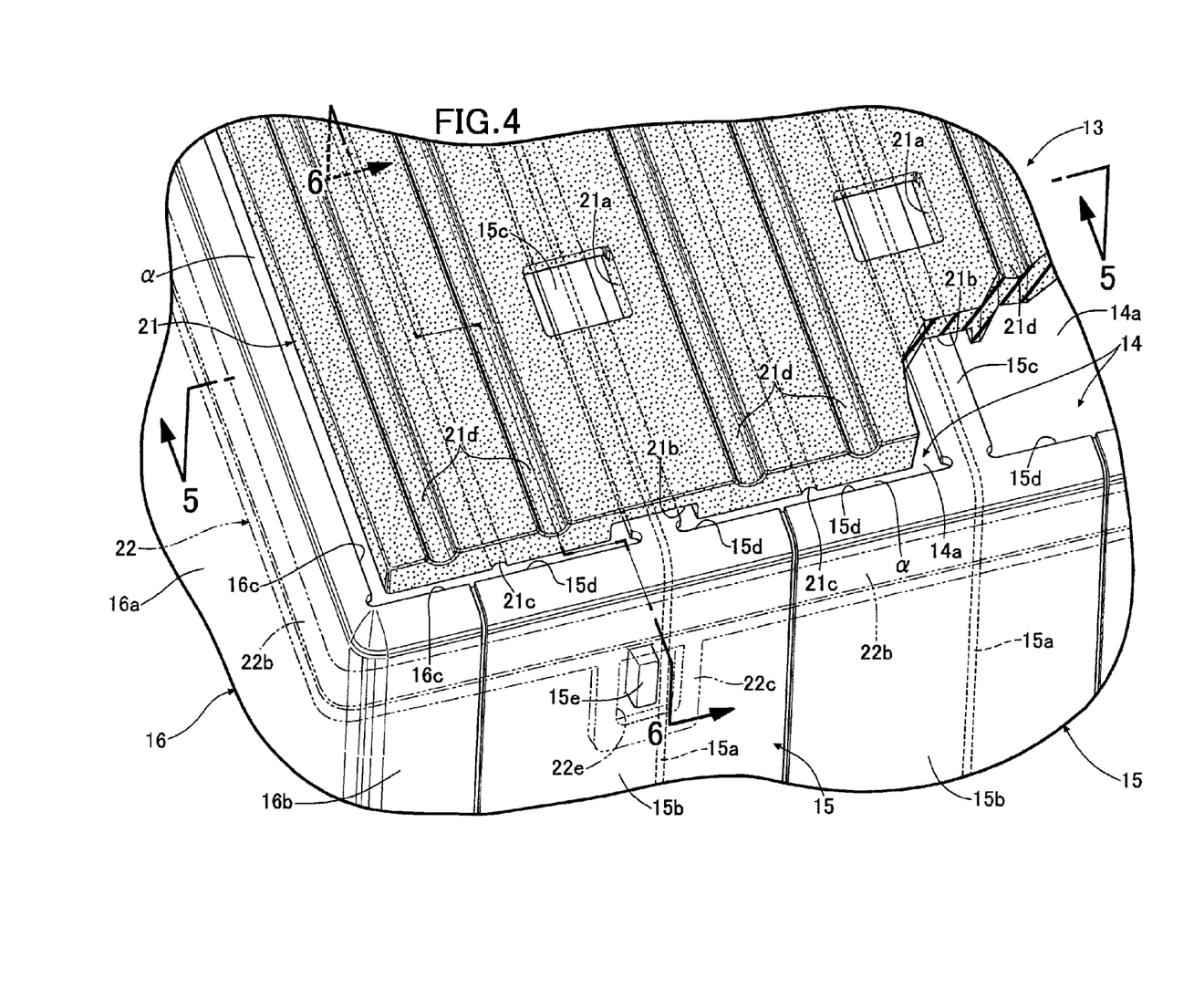
FIG. 4 is an enlarged view of part 4 in FIG. 3. (first embodiment)

Because of this, while viewing, through the positioning holes 21a of the heat transfer sheet 21, the cooling surfaces 14a of the battery cells 14, that is, the lower flanges 15c of the intermediate holders 15 exposed on the cooling surfaces 14a of the battery module 13, a worker positions and adheres the heat transfer sheet 21 to the cooling surfaces 14a so that the lower flanges 15c are positioned in the middle part of the positioning holes 21a (see FIG. 4). Since a plurality of positioning holes 21a are provided and distributed over the entire cooling surfaces 14a, the precision of positioning of the heat transfer sheet 21 is very high. In this process, since the width of the lower flange 15c is smaller than the width of the positioning holes 21a and 21a, opposite edges of the lower flange 15c can be viewed through the positioning holes 21a and 21a, thereby further enhancing the precision of positioning of the heat transfer sheet 21.

Figure 5:
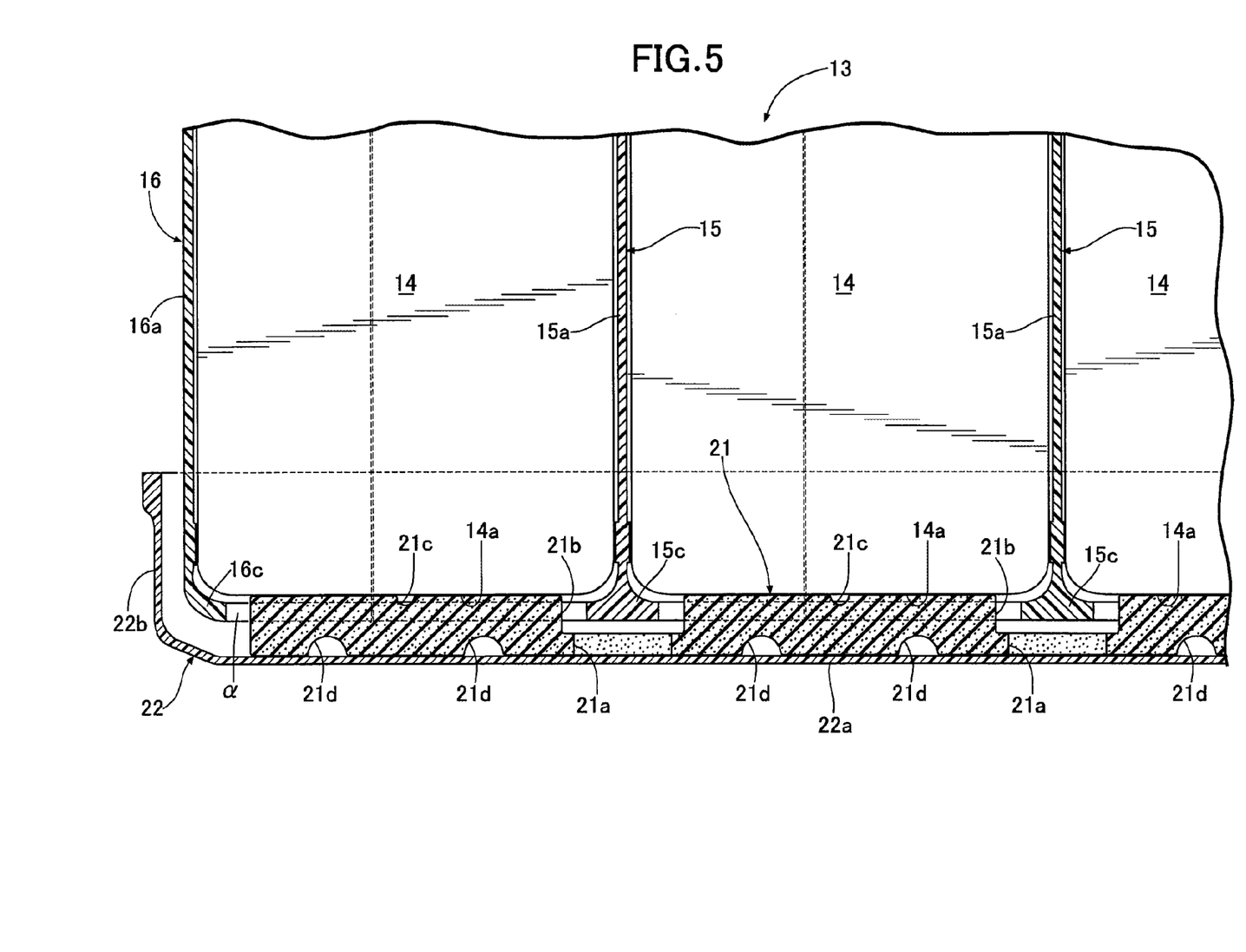
FIG. 5 is a sectional view along line 5-5 in FIG. 4. (first embodiment)
Figure 6:
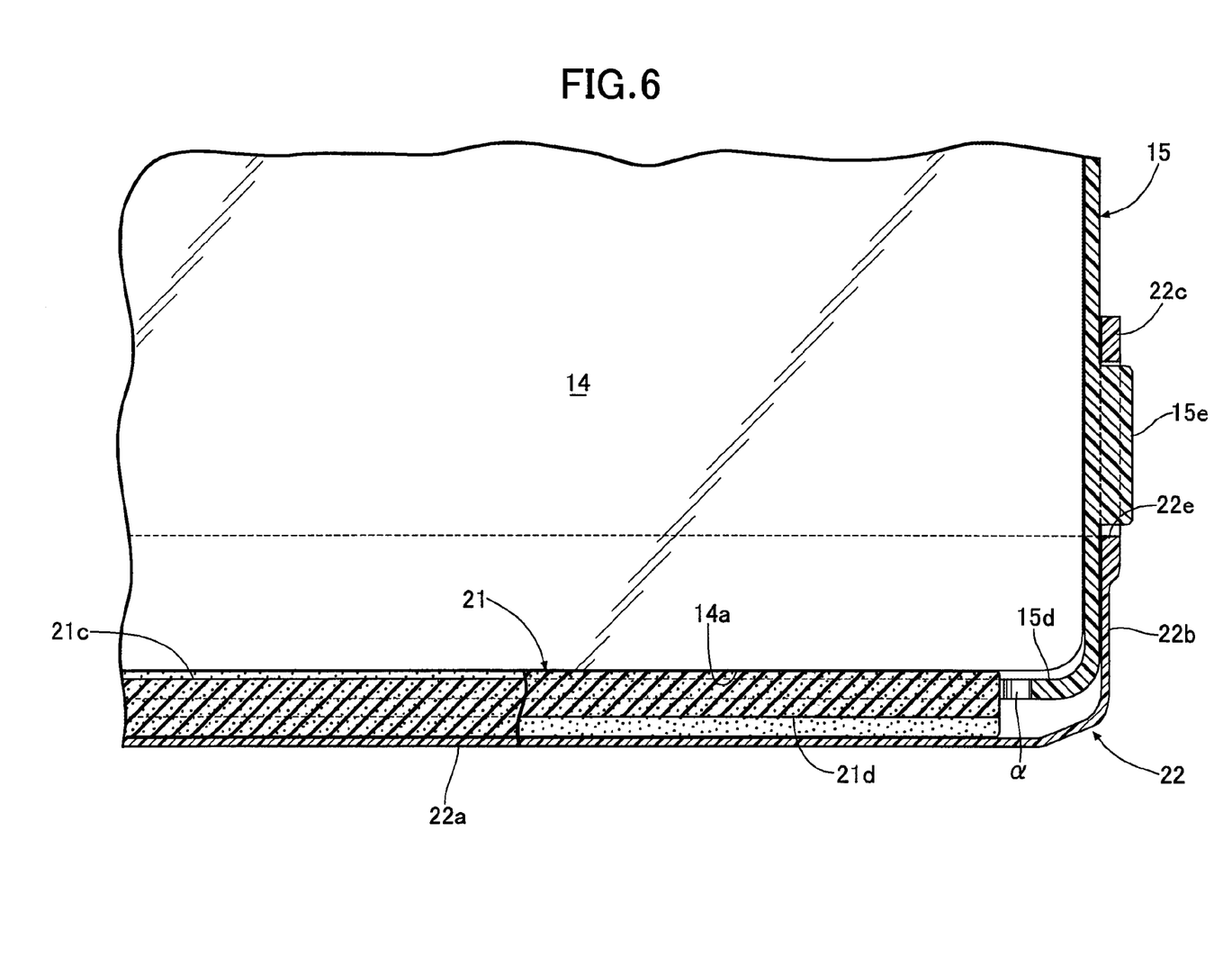
FIG. 6 is a sectional view along line 6-6 in FIG. 4. (first embodiment)

As is clear from FIG. 4 to FIG. 6, when the heat transfer sheet 21 is affixed, there is interference with the lower flanges 15c of the intermediate holders 15 protruding from the cooling surfaces 14a of the battery module 13, but it becomes possible, by fitting the lower flanges 15c into the positioning grooves 21b formed in the upper face of the heat transfer sheet 21, to affix the heat transfer sheet 21 without problems. In this process, the heat transfer sheet 21 is physically positioned by fitting the positioning grooves 21b and the lower flanges15c to each other, thus further improving the precision of positioning. Furthermore, since, in a state in which the heat transfer sheet 21 is affixed, the gap α is formed between the outer periphery of the heat transfer sheet 21 and the projecting wall portions 15d, 16c, 16c of the intermediate holders 15 and the end holders 16 and 16 of the battery module 13, even if the position at which the heat transfer sheet 21 is affixed is slightly displaced, the heat transfer sheet 21 does not interfere with the projecting wall portions 15d, 16c, 16c.

Moreover, since the corners of the positioning holes 21a are rounded, even if the position at which the heat transfer sheet 21 is affixed is displaced and it needs to be re-affixed, it is possible to avoid a situation in which stress is concentrated at the corners of the positioning holes 21a and the heat transfer sheet 21 is torn.

When the heat transfer sheet 21 is affixed to the cooling surfaces 14a of the battery module 13, if air is trapped between the upper face of the heat transfer sheet 21 and the cooling surfaces 14a of the battery module 13, the heat transfer sheet 21 cannot make intimate contact with the cooling surfaces 14a via the air portion, and there is a possibility that the air will form a heat insulating layer to thus degrade the thermal conductivity. However, since the plurality of first air vent grooves 21c are provided on the upper face of the heat transfer sheet 21, any trapped air is discharged to the outside via the first air vent grooves 21c, thus putting the heat transfer sheet 21 in intimate contact with the cooling surfaces 14a and thereby enhancing the thermal conductivity. In this arrangement, needless to say the positioning grooves 21b also function as air vent grooves.

As described above, when the heat transfer sheet 21 is affixed to the cooling surface 14a of the battery module 13, as shown in FIG. 1, FIG. 3 and FIG. 4, a lower part of the battery module 13 is fitted to the tray-shaped insulating sheet 22, and the latching holes 22d, 22d, and 22e of the six latching portions 22c of the insulating sheet 22 are latched onto the six latching projections 15e of the side flanges 15b of the three intermediate holders 15, thus carrying out integration so that the insulating sheet 22 does not fall off from the battery module 13. The operation of engaging the latching holes 22d, 22d, and 22e with the latching projections 15e is easy since the insulating sheet 22 is thin and freely deformable.

Since the battery module 13 is formed by stacking twelve battery cells 14, it is not possible to avoid variation occurring in a gap D between the six latching projections 15e on the sides of the intermediate holders 15 (see FIG. 3 and FIG. 8) due to tolerances accumulating. However, after the two latching holes 22d and 22d in the middle in the long side direction of the insulating sheet 22 are engaged with the two latching projections 15e and 15e in the middle in the long side direction of the battery module 13, when the four latching holes 22e at opposite ends in the long side direction of the insulating sheet 22 are engaged with the four latching projections 15e at opposite ends in the long side direction of the battery module 13, since the width of the four latching holes 22e at opposite ends in the long side direction is set so as to be larger than the width of the corresponding four latching projections 15e, even if there is a variation in the gap between the latching projections 15e, the operation of engaging the latching holes 22d, 22d, 22e with the latching projections 15e can be carried out smoothly.

In the present embodiment, it is possible, by positioning the insulating sheet 22 with the two latching holes 22d and 22d in the middle in the long side direction as a reference, to disperse the cumulative tolerance in the thickness of the battery cells 14 in two directions, thereby minimizing displacement between the four latching holes 22e at opposite ends in the long side direction and the corresponding four latching projections 15e. If the insulating sheet 22 were to be positioned with the two latching holes 22e and 22e at one end in the long side direction as a reference, displacement between the two latching holes 22e and 22e at the other end in the long side direction and the corresponding two latching projections 15e and 15e would increase to twice that of the embodiment.

Figure 9:
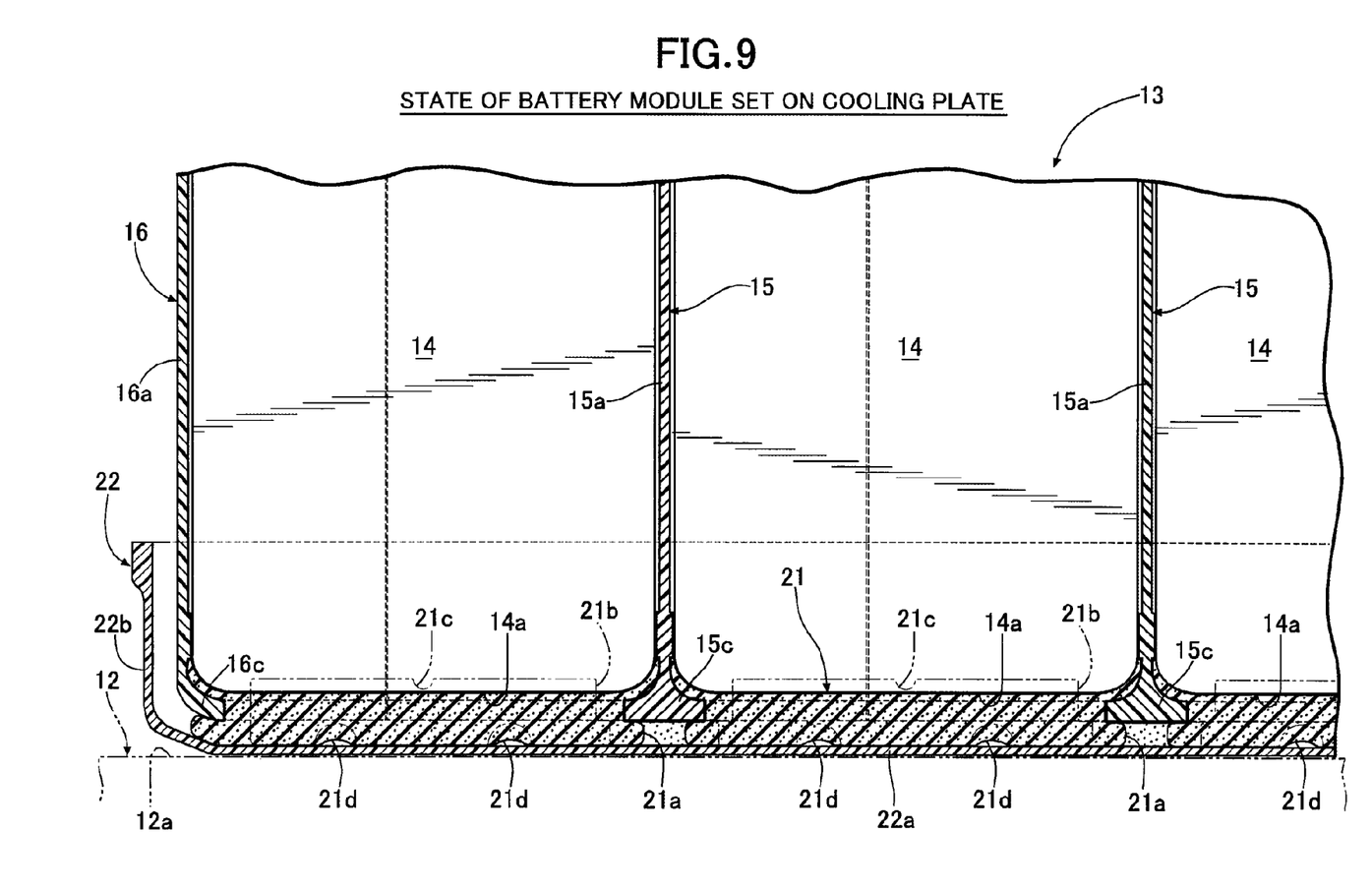
FIG. 9 is a diagram, corresponding to FIG. 5, for explaining the operation. (first embodiment)
Figure 10:
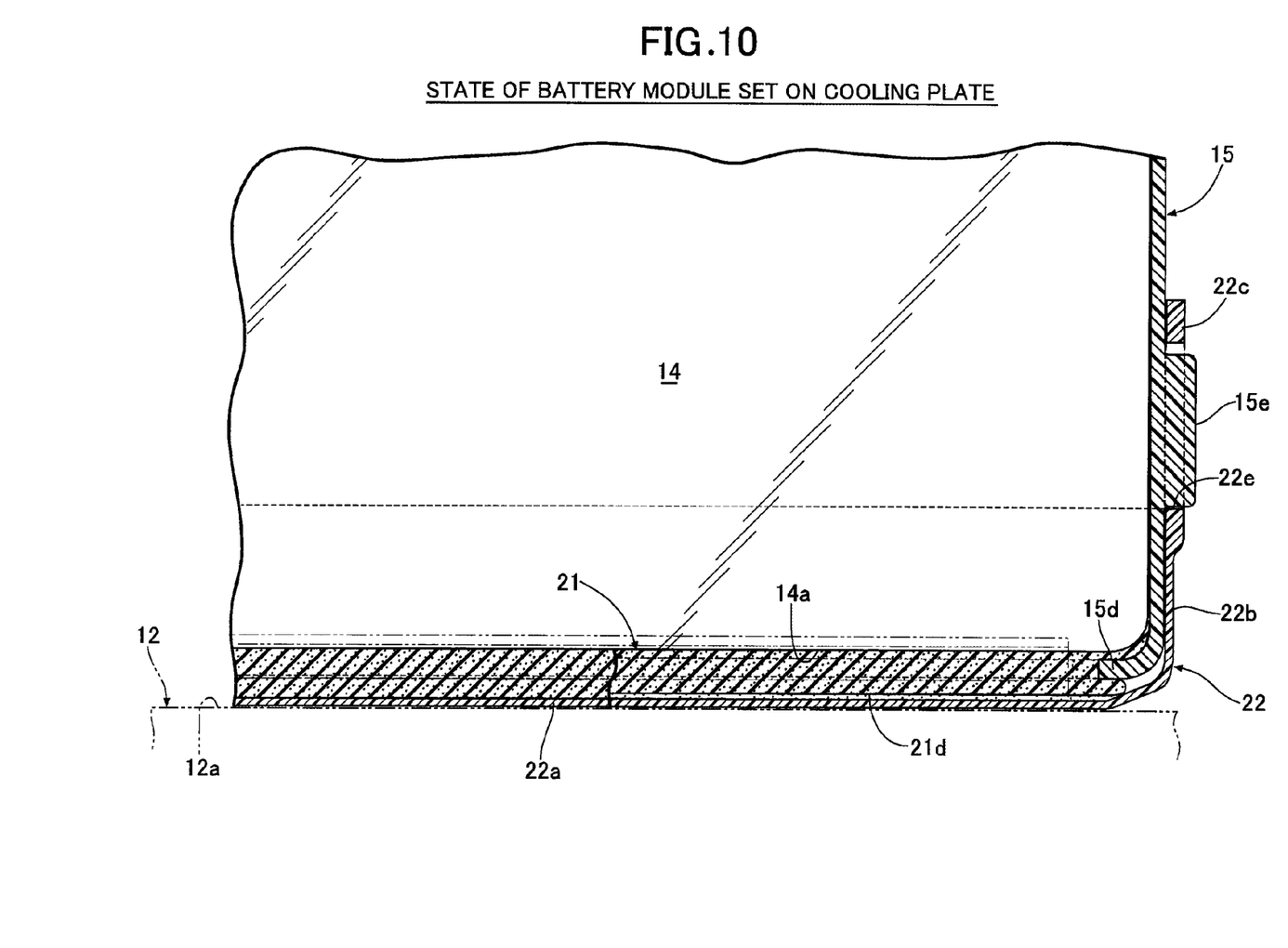
FIG. 10 is a diagram, corresponding to FIG. 6, for explaining the operation. (first embodiment)
Figure 11:
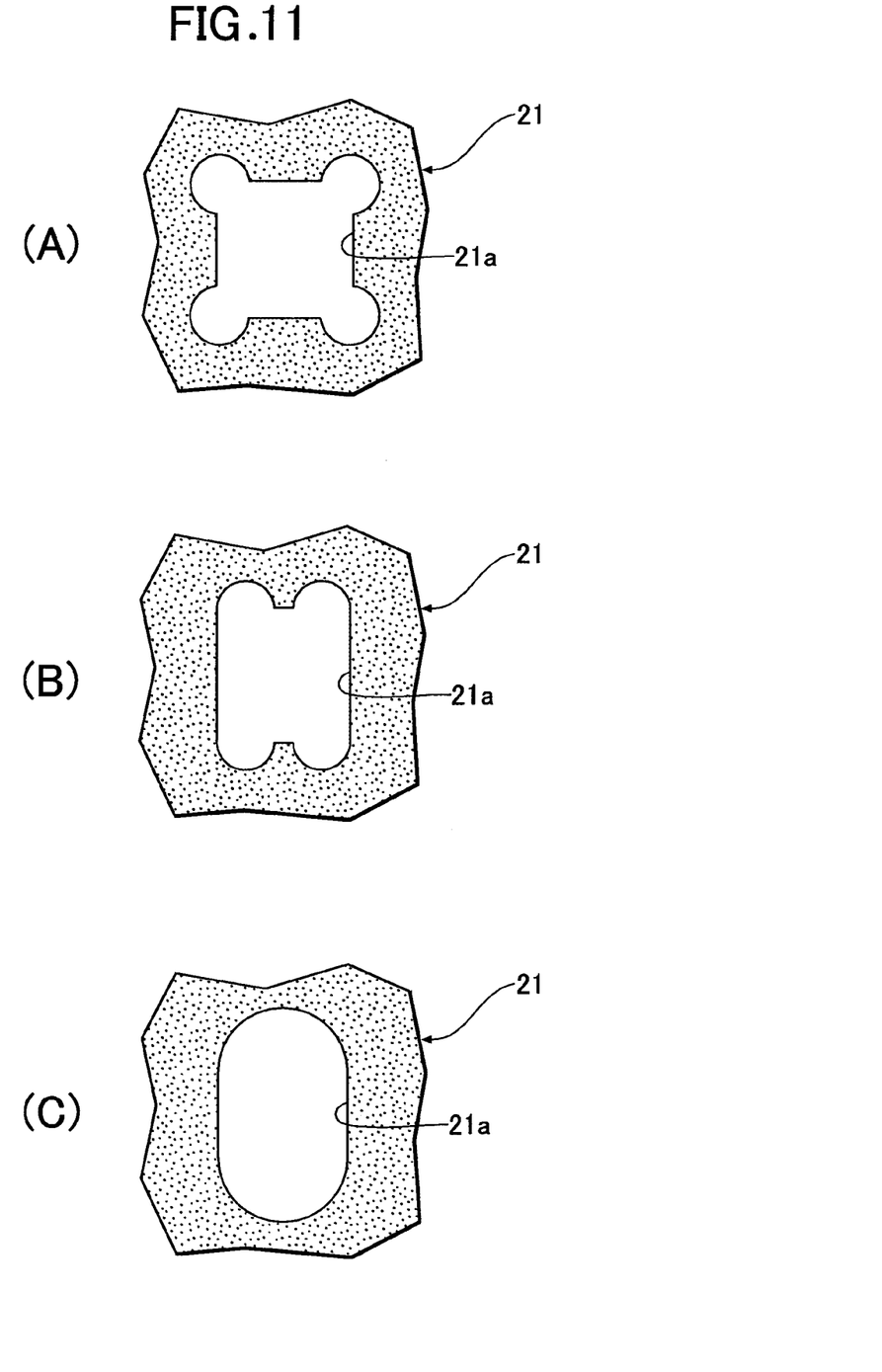
FIG. 11 is a diagram showing another embodiment of a positioning hole. (second to fourth embodiments)

When the insulating sheet 22 is fitted to the battery module 13 as described above, as shown in FIG. 1, the battery module 13 is placed on the upper wall portion 12a of the cooling plate 12, and secured to the mounting bosses 12d of the cooling plate 12 by means of the bolts 23 extending through the mounting flanges 17a of the end plates 17. As a result, as shown in FIG. 9 and FIG. 10, the heat transfer sheet 21 is subjected to the weight of the battery module 13, the heat transfer sheet 21 is compressed and squashed in the vertical direction, any gap between the upper face of the heat transfer sheet 21 and the cooling surfaces 14a of the battery module 13 and any gap between the lower face of the heat transfer sheet 21 and the upper wall portion 12a of the cooling plate 12 disappear, and heat transfer from the battery module 13 to the cooling plate 12 is carried out efficiently, thus improving the performance in cooling the battery module 13.

Although the bottom wall portion 22a of the insulating sheet 22 is present between the lower face of the heat transfer sheet 21 and the upper wall portion 12a of the cooling plate 12, since the insulating sheet 22 is made of a very thin synthetic resin and is easily deformable, the presence of the insulating sheet 22 does not cause a gap to occur that would interfere with heat transfer.

Furthermore, if air were to be trapped between the lower face of the heat transfer sheet 21 and the upper wall portion 12a of the cooling plate 12, strictly speaking between the lower face of the heat transfer sheet 21 and the upper face of the insulating sheet 22, there is a possibility that the air would prevent the heat transfer sheet 21 from coming into intimate contact with the upper wall portion 12a of the cooling plate 12 and the air would function as a heat insulator layer to thus degrade the thermal conductivity. However, since the plurality of second air vent grooves 21d are provided on the lower face of the heat transfer sheet 21, trapped air is discharged to the outside via the second air vent grooves 21d, thus putting the heat transfer sheet 21 in intimate contact with the upper wall portion 12a of the cooling plate 12 and enhancing the thermal conductivity.

When the heat transfer sheet 21 is compressed and squashed in the vertical direction, the outer periphery of the heat transfer sheet 21 attempts to spread outwardly, but since the projecting wall portions 15d, 16c, 16c of the intermediate holders 15 and the end holders 16 and 16 oppose the outer periphery of the heat transfer sheet 21 across the gap α, the outer periphery of the heat transfer sheet 21 is prevented from protruding outwardly from the outer periphery of the battery module 13 by being blocked by the projecting wall portions 15d, 16c, 16c. The heat transfer sheet 21, which is prevented from spreading outwardly by the projecting wall portions 15*d*, 16*c*, 16*c*, spreads inwardly so as to compress the positioning holes 21*a*, thus reducing the opening area of the positioning holes 21*a*.

The positioning holes 21*a* are inherently provided at positions corresponding to the lower flanges 15*c* of the intermediate holders 15 so as not to inhibit heat transfer from the cooling surfaces 14*a*; it is possible, by the opening area of the positioning holes 21*a* being reduced as described above and the cooling surfaces 14*a* exposed on opposite sides of the lower flanges 15*c* of the intermediate holders 15 being covered by the heat transfer sheet 21, to minimize the decrease in thermal conductivity caused by the positioning holes 21*a* being provided.

In the same way as for the positioning holes 21*a*, the positioning grooves 21*b*, the first air vent grooves 21*c*, and the second air vent grooves 21*d* are also squashed and eliminated or their cross-sectional areas are decreased, and it is therefore possible to minimize any decrease in thermal conductivity due to the positioning grooves 21*b*, the first air vent grooves 21*c*, and the second air vent grooves 21*d* being provided.

Furthermore, the lower face of the heat transfer sheet 21 abuts against the upper wall portion 12*a* of the cooling plate 12 via the entire region, but since the upper face of the heat transfer sheet 21 does not abut against the cooling surfaces 14*a* over the region of the lower flanges 15*c* of the intermediate holders 15, the heat transfer area of the upper face is smaller than the heat transfer area of the lower face, thus causing the problem that the thermal conductivity decreases. However, in accordance with the present embodiment, since the first air vent grooves 21*c* of the upper face of the heat transfer sheet 21 have a small cross-sectional area, they are completely eliminated due to squashing deformation, whereas since the second air vent grooves 21*d* of the lower face of the heat transfer sheet 21 have a small cross-sectional area, they are not completely eliminated by squashing deformation, and the heat transfer area of the lower face decreases by a portion corresponding to the remaining second air vent grooves 21*d*. As a result, the heat transfer area of the upper face and the heat transfer area of the lower face of the heat transfer sheet 21 are made uniform, thus preventing the thermal conductivity from being degraded.

Furthermore, since the positioning grooves 21*b* and the first air vent grooves 21*c* of the upper face of the heat transfer sheet 21 and the second air vent grooves 21*d* of the lower face of the heat transfer sheet 21 are disposed in parallel so as not to intersect each other when viewed from above and are disposed offset so as not to overlap each other in the vertical direction, it is possible to prevent the thickness of the heat transfer sheet 21 from being locally reduced due to them intersecting or overlapping in the vertical direction.

Moreover, when the heat transfer sheet 21 is squashed, the space between the positioning grooves 21*b* of the heat transfer sheet 21 and the lower flanges 15*c* of the intermediate holders 15 is eliminated, but a space may remain there. This is because this space opposes the lower flanges 15*c* and does not influence the thermal conductivity of the heat transfer sheet 21 and, moreover, the space increases the surface pressure between the upper face of the heat transfer sheet 21 and the cooling surfaces 14*a*, thereby preventing a gap from occurring in this portion.

Since the cooling plate 12 is a hollow member having defined in its interior the cooling medium passage 12*c*, when it is subjected to the weight of the battery module 13, the upper wall portion 12*a* flexes into a downward arc shape, and the distance between the upper wall portion 12*a* and the middle part in the long side direction of the cooling surfaces 14*a* of the battery module 13 increases compared with the distance between the upper wall portion 12*a* and the opposite end parts in the long side direction of the cooling surfaces 14*a* of the battery module 13. As a result, if the thickness of the heat transfer sheet 21 were uniform, the surface pressure of the middle part in the long side direction of the heat transfer sheet 21 would become low and that part would not fully undergo squashing deformation, a gap would occur in that part, and the thermal conductivity might decrease.

However, in accordance with the present embodiment, as shown in FIG. 7, since the thickness of the heat transfer sheet 21 is large in the middle part in the long side direction and small in the opposite end parts in the long side direction, even if the upper wall portion 12*a* of the cooling plate 12 flexes into a downward arc shape, the entire region of the heat transfer sheet 21 is subjected to an equal surface pressure to thus squash it in the middle part in the long side direction in the same manner as for the opposite end parts in the long side direction, thereby preventing a gap from occurring and avoiding any decrease in the thermal conductivity.

Moreover, when the upper wall portion 12*a* of the cooling plate 12 flexes into a downward arc shape, the middle part in the long side direction of the battery module 13 supported by the upper wall portion 12*a* attempts to flex into a downward arc shape, but since the thickness in the middle part in the long side direction of the heat transfer sheet 21 is large, the reaction force load that pushes the middle part in the long side direction of the battery module 13 upwardly is increased, thus suppressing flexing of the battery module 13. In addition thereto, as shown in FIG. 7, the plurality of positioning grooves 2 1*b* provided on the upper face of the heat transfer sheet 21 are formed so that those close to the middle part in the long side direction have a smaller groove width, and the middle part in the long side direction of the heat transfer sheet 21 becomes resistant to squashing to thus increase the upward reaction force load, thereby further reliably suppressing flexing of the battery module 13.

The battery cells 14 increase in temperature due to charging or discharging and decrease in temperature due to charging and discharging being stopped; moisture in the air condenses accompanying the decrease in temperature and becomes attached to the surface of the battery module 13. This condensed water flows downward by virtue of gravity, and when it reaches the cooling plate 12, it might generate a ground fault in which an electrode of the battery cells 14 is electrically connected to the cooling plate 12.

However, in accordance with the present embodiment, since the insulating sheet 22 disposed beneath the heat transfer sheet 21 is formed into a tray shape while including the side wall portions 22*b* rising from the outer periphery of the bottom wall portion 22*a*, it is possible to retain condensed water in its interior to thus prevent it from flowing out to the cooling plate 12, thereby reliably preventing the occurrence of a ground fault. Furthermore, since the insulating sheet 22 is formed from a water repellent material, condensed water attached to the surface thereof is in the form of isolated water droplets, thus preventing more effectively an electrical connection between the battery module 13 and the cooling plate 12.

An embodiment of the present invention is explained above, but the present invention may be modified in a variety of ways as long as the modifications do not depart from the spirit and scope thereof.

For example, in the embodiments the thickness of the heat transfer sheet 21 is large in the middle part in the long side direction and is constant in the short side direction, but it may be large in the middle part in the short side direction and may be constant in the long side direction or may be large both in the middle part in the long side direction and in the middle part in the short side direction. That is, the thickness of the heat transfer sheet 21 may be larger in the middle part than in the outer peripheral part.

The invention claimed is:

1. A battery and battery cooling structure, comprising:
a battery module in which a plurality of battery cells are stacked,
intermediate holders sandwiched between adjacent ones of the battery cells,
a cooling plate, and
a heat transfer sheet that has a capability to be deformed by pressure, the heat transfer sheet being held between the cooling plate and a cooling surface of the battery module, the cooling surface of the battery module extending along a stacking direction of the battery cells, and heat of the battery module is transferred from the cooling surface to the cooling plate via the heat transfer sheet to thus carry out cooling,
wherein the cooling plate is a hollow member in which a cooling medium passage is formed for a cooling medium to flow,
wherein the heat transfer sheet comprises grooves formed in an outer peripheral part and a middle part thereof, the groove formed in the middle part having a width smaller than a width of the groove formed in the outer peripheral part,
wherein the grooves formed in the outer peripheral part and the middle part are positioned so as to correspond to the intermediate holders when the heat transfer sheet is held to face the cooling surface of the battery module,
wherein the cooling plate is provided below the battery module in a vertical direction, and
wherein the heat transfer sheet is placed in contact with lower faces of the battery cells.

2. The battery cooling structure according to claim 1, wherein the heat transfer sheet is formed so as to have a larger thickness in the middle part than in the outer peripheral part.

* * * * *